United States Patent [19]

Ziaylek, Jr.

[11] Patent Number: 4,659,105

[45] Date of Patent: Apr. 21, 1987

[54] SAFETY BAR

[76] Inventor: Theodore Ziaylek, Jr., 140 Riverview Ave., Yardley, Pa. 19067

[21] Appl. No.: 819,666

[22] Filed: Jan. 17, 1986

[51] Int. Cl.[4] .............................................. B60R 21/10
[52] U.S. Cl. .................................... 280/748; 296/1 R
[58] Field of Search ............... 280/748, 751, 753, 756; 403/349, 348, 166; 296/1 R

[56] References Cited

U.S. PATENT DOCUMENTS

| | | | |
|---|---|---|---|
| 1,775,256 | 9/1930 | Rowe | 280/748 |
| 2,263,698 | 11/1941 | Hodgson | 280/748 |
| 2,668,583 | 2/1954 | Singer | 280/748 |
| 2,746,767 | 5/1956 | Evans | 280/748 |
| 2,755,101 | 7/1956 | Budde | 280/748 |
| 2,798,737 | 7/1957 | Sundlof | 280/748 |
| 2,820,655 | 1/1958 | Hileman | 403/349 |
| 2,923,559 | 2/1960 | Owens | 280/748 |
| 3,282,604 | 11/1966 | Goldberg | 280/748 |
| 3,423,781 | 1/1969 | Henson | 403/349 |
| 3,945,744 | 3/1976 | Metz | 403/349 |
| 4,273,360 | 6/1981 | McLoughlin et al. | 280/748 |
| 4,305,180 | 12/1981 | Schwartz | 403/349 |
| 4,357,034 | 11/1982 | McLoughlin et al. | 280/751 |
| 4,518,162 | 5/1985 | Gates | 403/349 |

Primary Examiner—Richard A. Bertsch
Attorney, Agent, or Firm—Sperry, Zoda & Kane

[57] ABSTRACT

A protective device for firefighters is disclosed, in the form of a bar that extends across the entrance of the jump seat compartment of a fire truck. Disclosed is an elongated tube connected by a universal joint to a support bracket. The tube has a slide that is spring urged outwardly into the socket of a companion bracket, thus providing a rigid safety bar strategically positioned to protect a firefighter when the fire apparatus is being driven at high speed over roughly paved streets and around sharp corners. A specially designed locking and release handle is normally biased to a locking position at the enlarged end of a guide slot. To be moved to a release position, the handle must be grasped and partially rotated with the slide, to align the handle with an elongated portion of the slot, whereby to permit the slide to be retracted and in this way permit the bar to be swung downwardly so that the firefighter may descend from the apparatus in minimum time.

12 Claims, 7 Drawing Figures

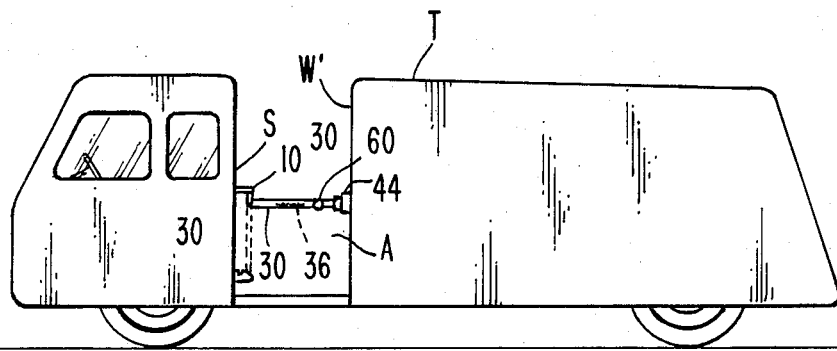
_Fig-1_
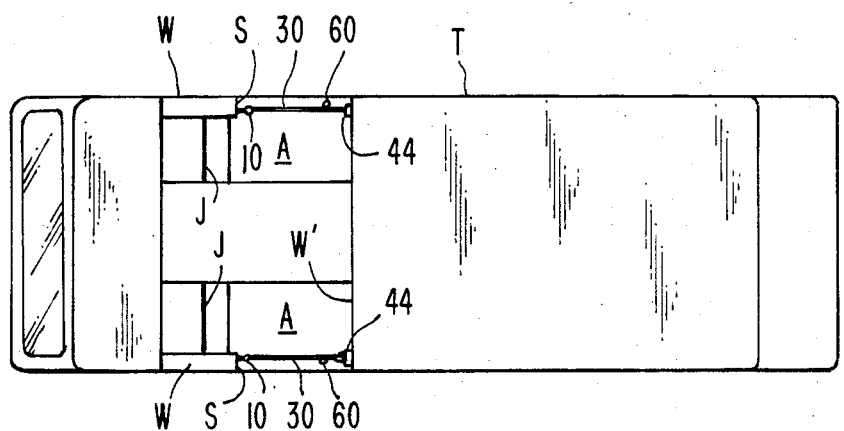
_Fig-2_
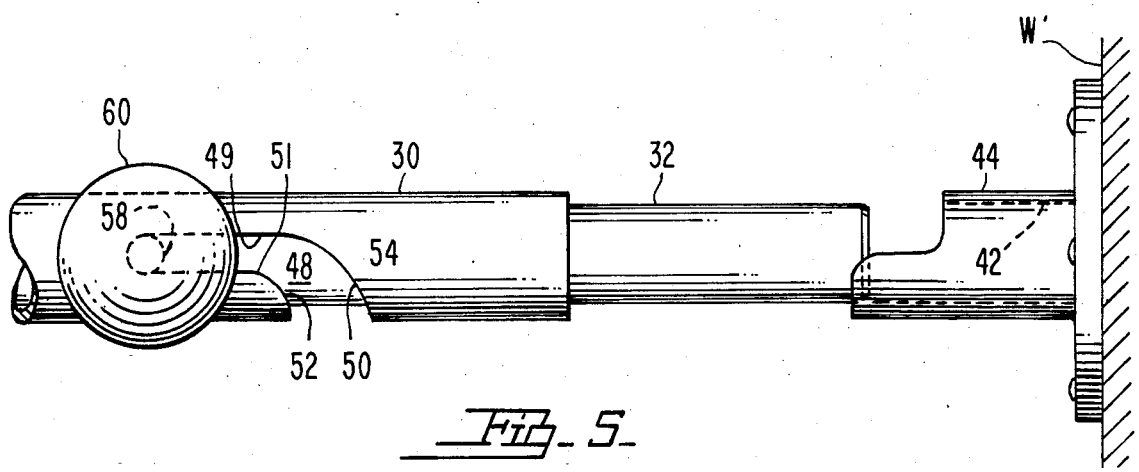
_Fig-3_

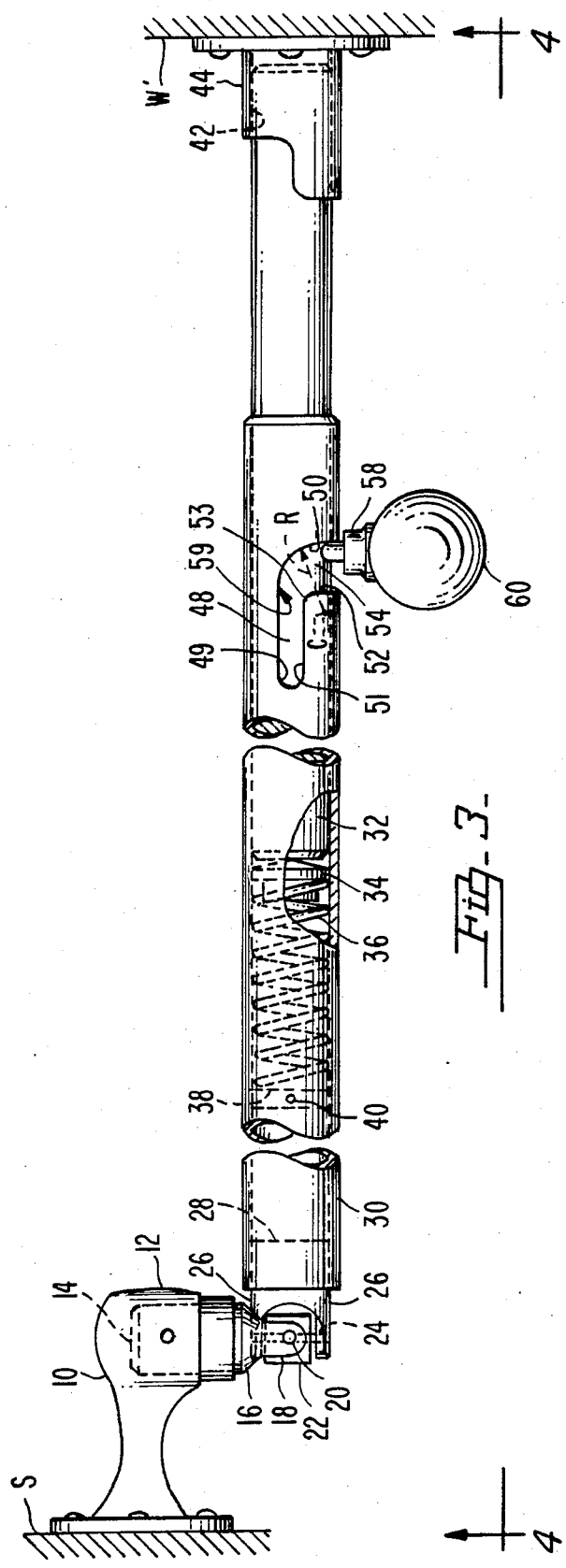
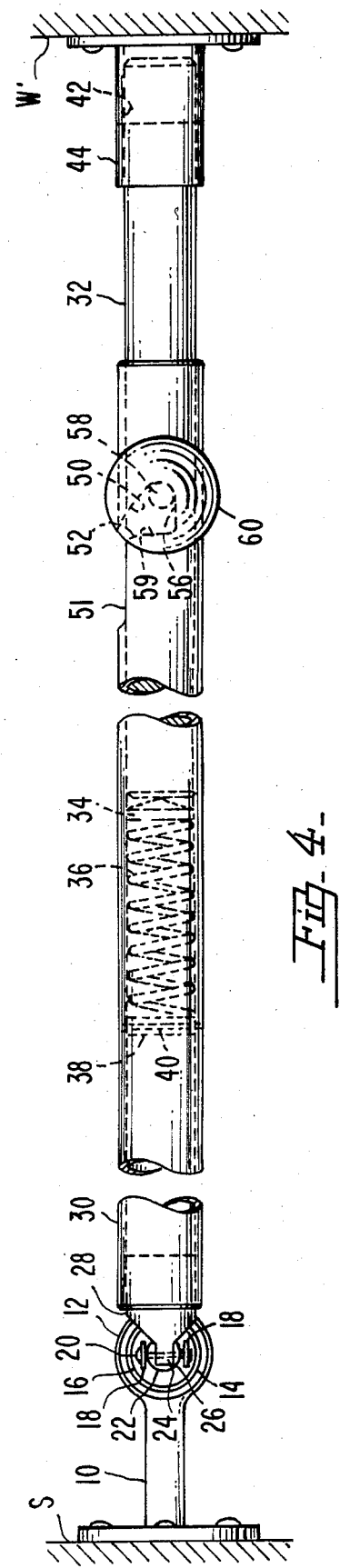

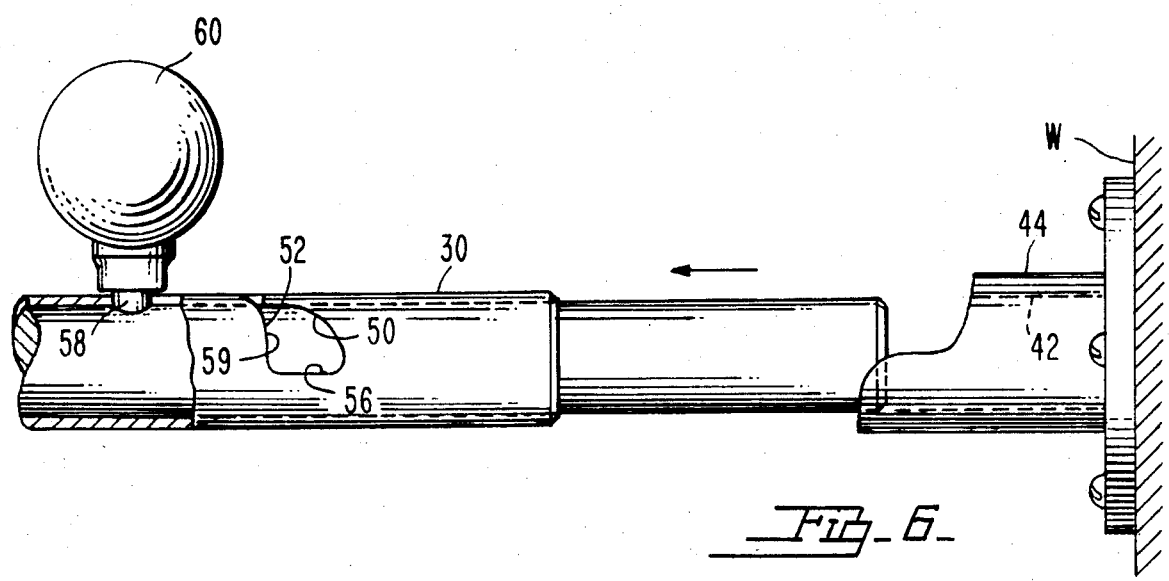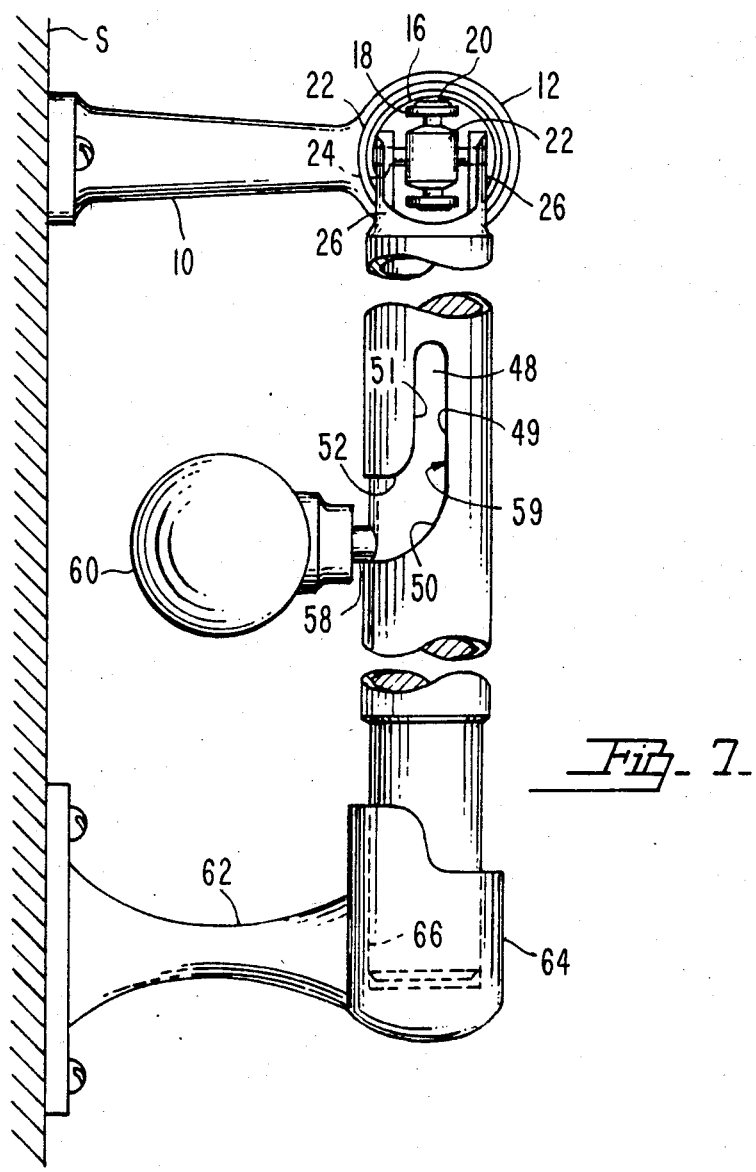

SAFETY BAR

BACKGROUND OF THE INVENTION

1. Field of the Invention

The present invention relates generally to devices so designed as to protect a person from accidentally falling from a moving vehicle. In a more particular sense, the invention has reference to a safety bar specially designed for use by firefighting or rescue personnel, through the provision of a retractable slide at the distal end of the bar, used in association with a locking handle that automatically moves to a locking position, but which can be retracted so as to permit the slide to be disengaged from an associated socket, whereby the handle can be swung to an open position to permit the user to leave the protected area.

2. Description of the Prior Art

Heretofore, there have been many safety bars devised, for the purpose of protecting vehicle occupants.

In the devices that have previously been invented for this purpose, various deficiencies have been noted, that have militated against use thereof as safety bars intended especially to be mounted in fire trucks or rescue vehicles.

In fire trucks, for example, jump seats are conventionally provided, and it is important that the occupants thereof be fully protected while the vehicle is enroute to its destination.

In such instances, the fire truck is often driven at relatively high speed, over roughly paved streets, and must negotiate sharp corners, again at relatively high speed. It is difficult in these circumstances for the occupants of the jump seat areas to keep from falling accidentally or being jostled from said areas, and accordingly, safety bars are necessary or at least very desirable, for the purpose of fully protecting these individuals.

In these special circumstances, it is extremely important that the bar meets certain requirements. For one, the bar should be designed so as to automatically lock, when it is aligned with the associated socket and the slide is released. And, as a second very important consideration, the bar should be so designed as to be incapable of being unlocked and disengaged except by positive action on the part of the firefighter. Yet another consideration is important, namely the adaptability for unlocking and disengaging the bar in an absolute minimum of time and without possibility of malfunction, thus to free the firefighter for duty without loss of even a few seconds.

The prior art devices, it is believed, have failed to meet these very important requirements. It is, accordingly, a primary object of the present invention to provide a safety bar that will be adapted to automatically lock when moved to a position in which the slide is aligned with the socket and is released; will be disengageable from the socket only by positive action on the part of the user, which action will entail the grasping of a handle and movement of the handle along a particular path essential for the purpose of retracting the slide; and that will be of trouble free design, capable of manufacture at comparatively low cost, and adapted for use over the full life of the vehicle, without any more than minimum possibility of corrosion or accumulation of dirt or other foreign materials.

SUMMARY OF THE INVENTION

Summarized briefly, the invention comprises an elongated bar connected at one end by a universal joint, to a supporting bracket, in position for the bar to extend across the entranceway to the jump seat area of a fire truck or other emergency vehicle. The bar, at one end, includes a slide or extension, which is spring urged outwardly so as to be engageable in a socket of a second bracket. A tubular member in which the slide telescopes, includes a slot from which extends a handle carried by the slide. The slot is so formed that when the handle is released to permit the slide to project from the tubular member, a cam surface on the slot will bias the handle through a 90° turn, to a slide-locking position. In this position, the handle cannot be accidentally retracted, and in order to disengage the slide from the socket, it becomes necessary that the handle be grasped, and pulled upwardly and toward the user in a direction normal to the length of the bar, thereby causing the handle to ride along the cam surface and become aligned with an elongated portion of the slot to permit retraction of the slide from the socket in which it has been engaged.

When the slide has been so disengaged, the bar can be swung out of the way, and the slide can be re-engaged in another bracket in which it remains whenever the jump seat area is to be left fully accessible, as for example, when the vehicle is in the fire house, ready for the next emergency alarm.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side elevational view of a fire truck equipped with the safety bar, the bar being shown in full lines in locked, use position and in dotted lines in a retracted position;

FIG. 2 is a top plan view of the truck equipped with the safety bar;

FIG. 3 is an enlarged plan view, in which parts have been broken away, illustrating the safety bar in its locked position, as it would appear when extended across the entrance to the jump seat area of an emergency vehicle;

FIG. 4 is a front elevational view thereof, as seen from the line 4—4 of FIG. 3;

FIG. 5 is fragmentary plan view showing the slide retracted;

FIG. 6 is a fragmentary front elevational view, showing the slide retracted; and FIG. 7 is a front elevational view in which portions have been broken away, wherein the safety bar has been swung to and locked in its non-use, ready position.

DESCRIPTION OF THE PREFERRED EMBODIMENT

The reference numeral 10 designates a fixedly mounted bracket, secured to a supporting surface S such as a wall of fire truck T or other emergency vehicle. The bracket 10 extends outwardly from a wall W extending adjacent a jump seat J. The jump seat is completely conventional, and accordingly a full description thereof is believed unnecessary. A typical jump seat is illustrated in U.S. Pat. No. 3,971,591 issued July 27, 1976 to John Ziaylek, and the disclosure of the seat construction found in that patent is incorporated in the present application by reference.

The purpose of the safety bar comprising the present invention is to protect the occupant of a jump seat such as that disclosed in the above designated patent. Accordingly, bracket 10 is so positioned as to cause the safety bar carried thereby to extend across and in front of the entranceway to the jump seat area.

Bracket 10, in the illustrated example, may thus include a socket portion 12, in which is pinned the end 14 of a universal joint 16.

Universal joint 16 includes transversely spaced trunnion support elements 18 formed with openings receiving the ends of trunnions 20 projecting outwardly from opposite sides of a cylindrical block 22 having at right angles to the trunnions a pivot pin 24 the ends of which engage in pivot pin support elements 26 projecting from a universal joint fitting 28 fixedly mounted in an elongated cylinder or tube 30.

In the opposite end of the tube, there is slidably and rotatably mounted a slide or locking extension 32, having an inner end bearing against a cap 34 fitted into the adjacent end of a compression coil spring 36, the other end of which bears against a circular stop or abutment 38 fixedly secured within tube 30 by a pin 40 extending through registering openings of the tube and abutment.

Slide 32 projects beyond tube 30, and its projecting end is engageable in a socket 42 formed in a sleeve type bracket 44 fixedly secured to a wall W'. The tube 30 and slide 32 thus extend as a bar across the jump seat area A defined between surface S and wall W'and are disposed in the full line position of FIG. 1 when the vehicle is en route, in response to an alarm.

Formed in tube 30, adjacent the distal end thereof in which slide 32 is mounted, is an elongated slot 48, extending parallel to the long axis of tube 30, and having one edge 49 merging at the open end of the slot into a radiused cam surface 50 the radius R of which extends from a center C located beyond a straight edge portion of stop surface 52 intersecting with the other longitudinal edge 51 of slot 48 (see FIG. 3). Edge 51 is straight for the greatest part of its length, but a short distance from its intersection with edge 52, is formed with a radiused edge portion 53 having the center C in common with the curved edge 50. Slot 48, between the curved edge 50 and the edge 52, is of substantial width, forming an enlarged end portion 54 of the slot extending laterally from the open end of the elongated slot 48 and having (see FIG. 4) an end edge 56 which is substantially straight and which extends in parallel relation to the straight, opposite edges 49, 51 of slot 48.

The slot 48, together with the enlarged end 54 thereof, comprises a slot means generally designated 59, which may be appropriately considered as being approximately L shaped, with the portion thereof defined by edges 49, 51 extending as a straight, elongated slot portion parallel to the length of the tube 30, and having a length greater than the depth of the socket 42. This portion constitutes an elongated, straight leg of the slot means, having an open end or throat merging into a short leg that extends generally transversely of the length of the tube, said short leg of the slot means hence being defined between the straight edge 52 and the radiused edge 50, and being progressively increased in width to its closed end defined by the end edge 56 thereof.

Fixedly secured to and projecting laterally from the slide 32 is the shank 58 of a handle 60, said shank extending through the slot means 59 and being normally spring biased against the radiused cam surface 50 of the slot means.

As shown in FIG. 7, when the slot means is retracted from the bracket 44, the bar is freed to swing to the position shown in FIG. 5, after which the slide is engageable in the socket 66 of the head 64 of a bracket 62 fixedly secured to the supporting surface S in vertically downwardly spaced relation to the bracket 10.

As used hereinafter in the claims, the bracket 44 should be considered as a first bracket; the bracket 62 is a second bracket; and bracket 10 is termed a third bracket. Referring now to FIGS. 3 and 4, in these figures of the drawing the tube 30 is extended horizontally, in the same position as is shown in full lines in FIG. 1, in alignment with the recess of the first bracket 42. As used herein and in the appended claims, this is a first position of the tube. When, however, the tube is swung downwardly on the third bracket 10 to align with the recess of bracket 62 as shown in FIG. 7, the tube is now regarded as being in a second position, shown also in dotted lines in FIG. 1.

In use, normally the safety bar would be disposed as shown in FIG. 7, when the vehicle is parked. In these circumstances, it extends vertically downwardly from bracket 10, in the dotted line position shown in FIG. 1, in parallel spaced relation to the adjacent vertical supporting surface S. At this time, the jump seat area A is fully accessible, that is, the safety bar is in an out-of-the-way position, so that the firefighter can leap into the jump seat before the vehicle gets underway following sounding of an alarm.

Before the vehicle gets underway, the firefighter grasps handle 60, and shifts the same laterally, along the curving cam surface 50. Cam surface 50 biases the handle in a direction away from the bracket 62, and as a result, slide 32 is retracted from socket 66 against the opposing force of spring 36.

As the shank 58 reaches the end of the cam surface 50, now bearing against the straight edge 49, the user pulls the handle rearwardly, that is, upwardly in FIG. 7, toward the closed end of slot 48. This completely disengages the slide 32 from the socket 66.

With the handle fully retracted and held in this position, the user swings the bar upwardly through 90°, to the position shown in FIG. 3. At this time, the handle is still being held in fully retracted position as shown in FIG. 5. Lining up slide 32 with socket or recess 42, the firefighter now releases the handle, so that the slide enters the recess 42.

As the spring expands with the handle 60 now released, the spring biases the handle toward the right in FIG. 5, toward the open end of the slot 48. Once again, cam surface 50 engages the shank 58 under the force of the spring, and as a result, causes the handle to be turned through 90°, biasing the slide 32 into the socket 42. The shank 58 of the handle ultimately reaches the position shown in FIG. 4, where it remains as the vehicle proceeds to its destination.

The arrangement fully protects the occupant of the seat, since the continuing bias of the spring against the slide locks the handle in the position shown in FIG. 4. Any heavy bumps or vibrations transmitted to the safety bar as the vehicle proceeds at high speed towards its destination, are overcome by the force of the spring, that is, any tendency of the shank 58 to accidentally move upwardly in FIG. 4 requires that it compress the spring as it does so, and as a result, such tendency is effectively overcome by the opposing force of the spring exerted in a direction axially of the safety bar.

When the vehicle arrives at its destination, the firefighter must leave the vehicle with an absolute minimum of delay. To do so, the firefighter grasps the handle, and once again rotates the handle, moving it upwardly as viewed in FIG. 4, so that the cam surface 50 biases the handle rearwardly, after which the user pulls the handle along the entire length of the slot portion 48, against the restraint of the spring 36, until the bar 32 is completely disengaged from the socket 42 as shown in FIG. 5, to permit him to exit the jumpseat area A.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A safety bar for protecting the occupant of an emergency vehicle, comprising:
    (a) a first bracket having a locking recess, said first bracket being adapted for attachment to a supporting surface located at one side of an area in which said occupant is seated;
    (b) a second bracket having a recess adapted for mounting on a supporting surface at the opposite side of said area;
    (c) a third bracket adapted to be fixedly mounted upon the supporting surface at the same side of said area as the second bracket;
    (d) a tube pivotally connected to the third bracket for swinging movement between a first position in which the tube is aligned with the recess of the first bracket, whereby to extend in front of an occupant seated in said area, and a second position in which the tube is aligned with the recess of the second bracket, whereby to be disposed at one side of and clear of said area;
    (e) a locking extension slidably and rotatably mounted in the tube under spring bias tending to engage the same in either of said recesses, said tube having an approximately L shaped slot; and
    (f) a handle on the slide projecting through said slot, the L shape of the slot defining communicating, approximately perpendicularly related legs on the slot one of which extends parallel to the length of the tube, the other extending approximately normally to said length, the slide being under spring bias tending to urge the handle toward the second named leg of the slot, said slot having a cam surface against which the handle bears under said spring bias, for normally urging the handle into the second named leg of the slot, thereby to releasably lock the slide within a selected one of said recesses.

2. A safety bar as in claim 1 wherein the overall length of the slot is greater than the depth of either of said recesses.

3. A safety bar as in claim 1 wherein the first leg of the slot is greater in length than the depth of either of said recesses.

4. A safety bar as in claim 1 wherein said cam surface is continuously curved from end to end thereof.

5. A safety bar as in claim 4 wherein the cam surface merges into one edge of the first leg of the slot.

6. A safety bar as in claim 5 wherein the cam surface forms one edge of the second leg of the slot.

7. A safety bar as in claim 6 wherein the other edge of the first leg of the slot is parallel to said one edge of said first leg.

8. A safety bar as in claim 7 wherein the other edge of the second leg of the slot is straight.

9. A safety bar as in claim 8 in which said other edge of the second leg is in perpendicular relation to the edges of the first leg of the slot.

10. A safety bar as in claim 9 in which said other edge of the first leg of the slot merges into a curved edge portion intersecting with said other edge of the second leg.

11. A safety bar as in claim 10 in which said curved portion that intersects with the other edge of the second leg is curved about a center common to that about which said one edge of the second leg is curved.

12. A safety bar as in claim 11 in which the radius of the cam surface is longer than the transverse distance across the slot as measured between said cam surface and said other edge of the second leg of the slot.

* * * * *